United States Patent [19]
Guidry

[11] Patent Number: 6,094,851
[45] Date of Patent: Aug. 1, 2000

[54] FISHING ROD HOLDER WITH AUTOMATIC HOOK SETTING MECHANISM

[76] Inventor: Gary D. Guidry, 411 Ash St. Apt. F, Sulphur, La. 70663

[21] Appl. No.: 09/226,207

[22] Filed: Jan. 7, 1999

[51] Int. Cl.[7] .................................................. A01K 97/12
[52] U.S. Cl. ............................................................ 43/15
[58] Field of Search ........................................... 43/15, 16

[56] References Cited

U.S. PATENT DOCUMENTS

| | | | |
|---|---|---|---|
| 2,744,351 | 5/1956 | Smith | 43/15 |
| 2,770,906 | 11/1956 | Hood | 43/15 |
| 2,804,277 | 8/1957 | Kinder | 43/15 |
| 2,964,868 | 12/1960 | Bennett | 43/15 |
| 2,986,834 | 6/1961 | Irwin | 43/15 |
| 3,055,136 | 9/1962 | Scott | 43/15 |
| 3,619,931 | 11/1971 | Brummell | 43/15 |
| 3,699,701 | 10/1972 | Jacobs | 43/15 |
| 3,722,127 | 3/1973 | Atkins | 43/15 |
| 3,837,109 | 9/1974 | DeJulio | 43/15 |
| 3,897,646 | 8/1975 | Sheets | 43/15 |
| 3,977,117 | 8/1976 | Zahner | 43/15 |
| 4,133,131 | 1/1979 | Davy | 43/21.2 |
| 4,235,035 | 11/1980 | Guthrie | 43/15 |
| 4,391,059 | 7/1983 | Cordova | 43/15 |
| 4,461,113 | 7/1984 | Erwin | 43/15 |
| 4,471,553 | 9/1984 | Copeland | 43/15 |
| 4,676,018 | 6/1987 | Kimball | 43/15 |
| 4,730,408 | 3/1988 | Miller | 43/15 |
| 4,750,286 | 6/1988 | Gray | 43/15 |
| 4,920,681 | 5/1990 | Toliver, Jr. et al. | 43/21.2 |
| 4,993,181 | 2/1991 | Cooper | 43/15 |
| 5,279,064 | 1/1994 | Jaeger | 43/21.2 |
| 5,359,802 | 11/1994 | Gutierrez | 43/16 |
| 5,533,294 | 7/1996 | Coulter | 43/15 |
| 5,542,205 | 8/1996 | Updike | 43/15 |
| 5,873,191 | 2/1999 | Bova | 43/15 |
| 5,903,998 | 5/1999 | Hawkins | 43/15 |

*Primary Examiner*—Kurt Rowan
*Attorney, Agent, or Firm*—Jacobson, Price, Holman & Stern, PLLC

[57] ABSTRACT

A pivotally supported, resiliently biased fishing rod holder with a hook setting mechanism automatically actuated when a fish exerts tension an a fishing line when taking the bait on the fish hook. The fishing rod holder includes a tube receiving the handle end of a fishing rod in an open end thereof. The tube is biased about a pivot axis by a plurality of resilient cords extending between an opposite end of the pivotal tube and a support stand. The support stand and pivotal tube include a triggering mechanism including a trip roller and trip bar mounted on the pivotal tube and a holding bar mounted on the support stand with the trip bar engaged by the fishing line at adjustable points along the length of the trip bar to vary the sensitivity of the trigger mechanism. A lock bolt is inserted under an end portion of the pivotal rod holding tube to secure it against pivotal movement in a hook setting direction when setting up the fishing rod holder at a fishing site. A carrying handle is provided on the support stand to enable transport and the support stand includes a base structure that can be stared alongside a vertical stand to enable storage of the device in a more compact condition.

17 Claims, 8 Drawing Sheets

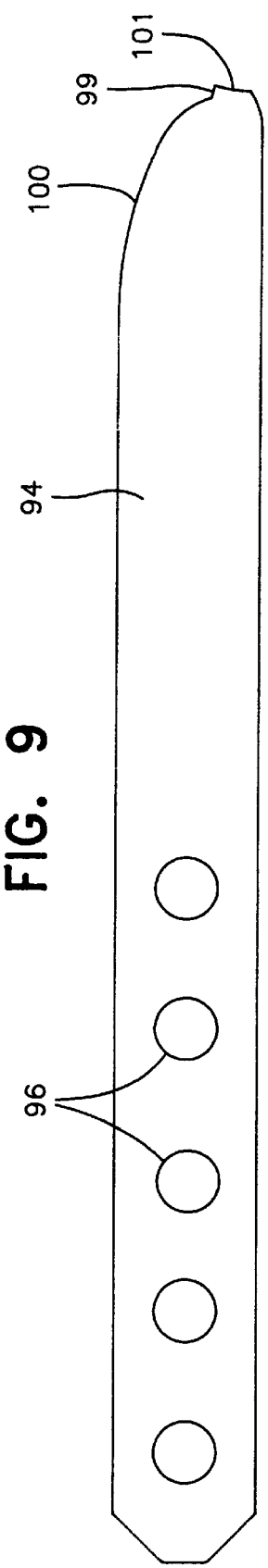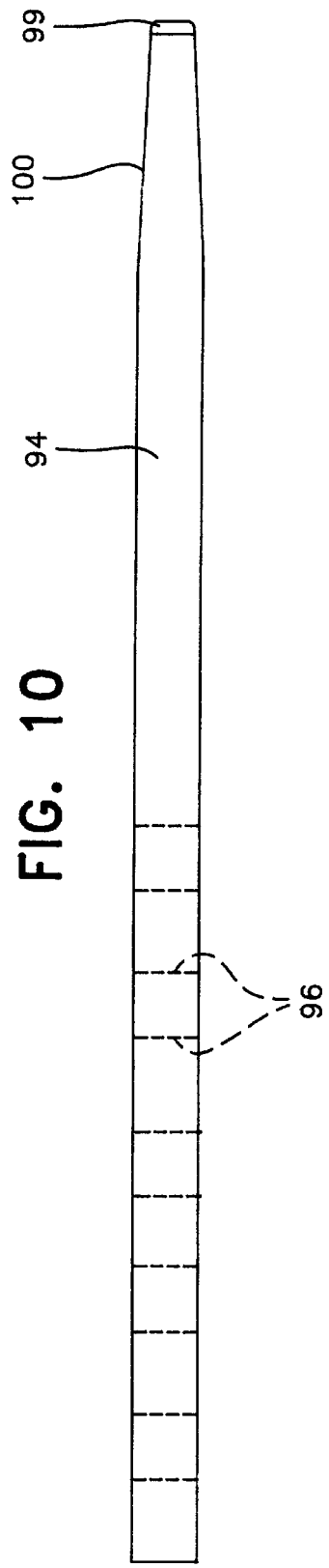

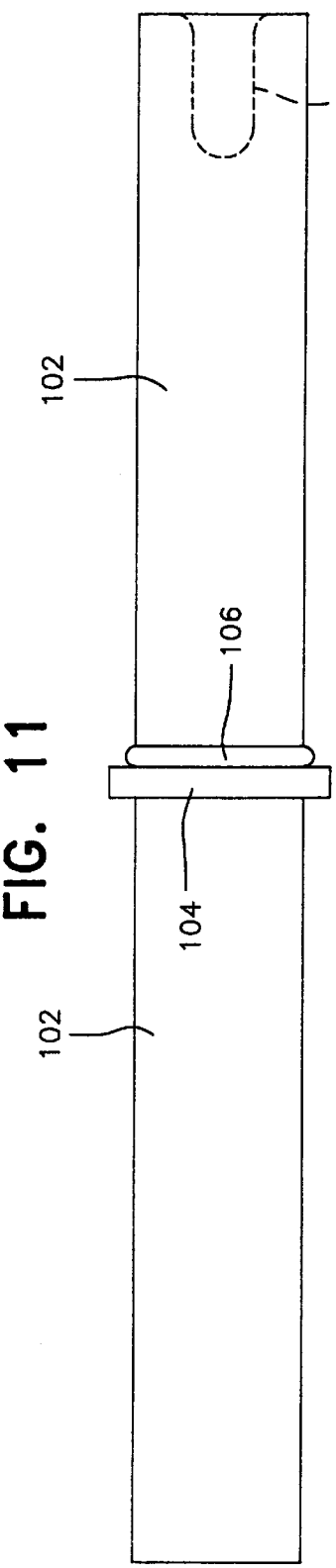
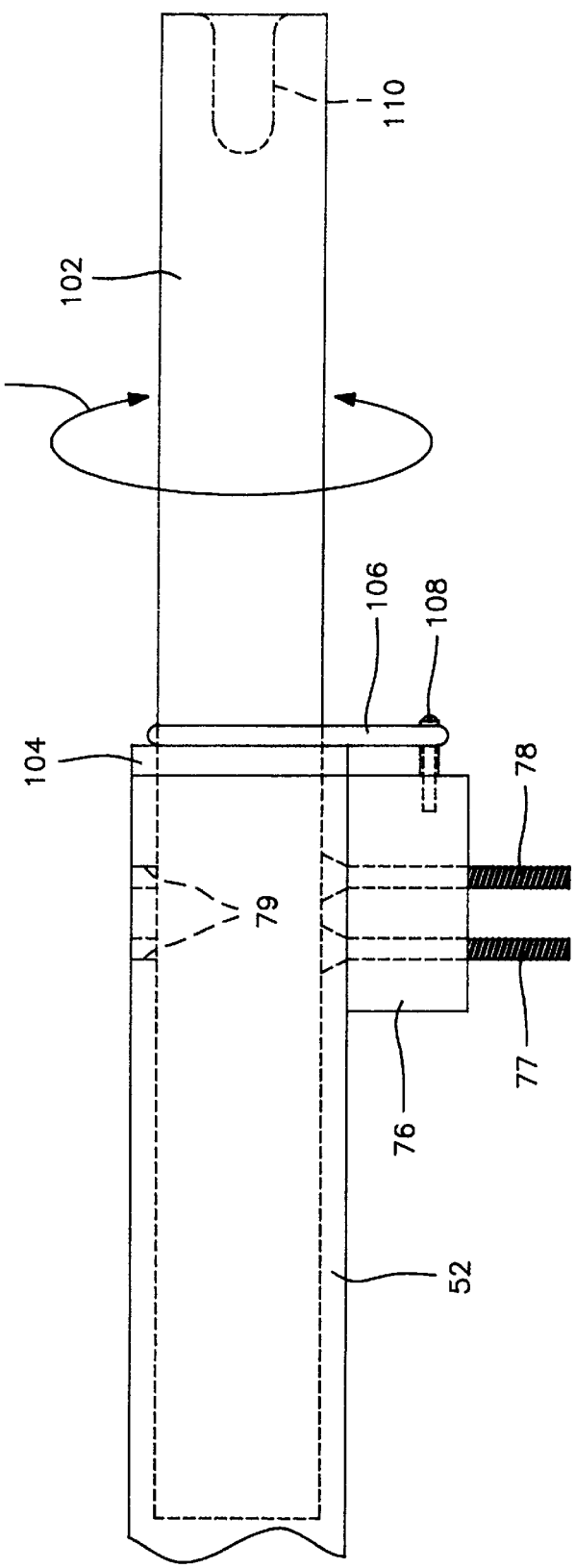

FISHING ROD HOLDER WITH AUTOMATIC HOOK SETTING MECHANISM

BACKGROUND OF THE INVENTION

1. Field of the Invention

The present invention generally relates to a pivotally supported, resiliently biased fishing rod holder with a hook setting mechanism automatically actuated when a fish exerts tension on a fishing line when taking the bait on the fish hook. The fishing rod holder includes a tubular member receiving the handle end of a fishing rod in an open end thereof. The tubular member is biased about a pivot axis by a plurality of resilient cords extending between an opposite end of the pivotal tubular member and a support stand. The support stand and pivotal tubular member include a trigger mechanism including a trip roller and trip bar mounted on the pivotal tubular member and a holding bar mounted on the support stand. The trip bar is engaged by the fishing line at adjustable points along the length of the trip bar to vary the sensitivity of the trigger mechanism. A lock bolt is inserted under an end portion of the pivotal fishing rod holding tubular member to secure it against pivotal movement in a hook setting direction when setting up the fishing rod holder at a fishing site. A carrying handle is provided on the vertical stand to enable transport and the vertical stand includes a base board that can be stored alongside the vertical stand to enable storage of the device in a compact condition.

2. Description of Prior Art

Fishing rod holders with automatic hook setting capabilities are well known and include structures in which a fishing line is engaged with a trigger mechanism to permit the fishing rod holding member to automatically pivot to set the hook. The following U.S. patents relate to this field of endeavor.

| | | |
|---|---|---|
| 2,986,834 | 4,133,131 | 4,993,181 |
| 3,897,646 | 4,471,553 | 5,279,064 |
| 3,977,117 | 4,920,681 | 5,542,205 |

The above prior patents disclose various arrangements in which a spring biased fishing rod holder is retained in fishing position by a trigger mechanism which is released in response to tension exerted on a fishing line by a fish taking the bait on a hook thereby automatically setting the hook in the fish to enable the fishing rod to be removed from the fishing rod holder and the fish reeled in.

The prior art does not disclose structural arrangements equivalent to the specific structural details of the present invention which enable it to be easily supported from the bank of a body of water, a pier or a boat while also enabling different angular settings of the fishing rod holder, variations in the sensitivity of the trigger mechanism, easy adjustment of the resilient structure which sets the hook, elimination of pinch points associated with a pivotal fishing rod holder and a structure which can be easily transported by a handle and reduced in overall size for transport and storage.

SUMMARY OF THE INVENTION

The fishing rod holder with automatic hook setting mechanism of the present invention includes a two part support including a vertical stand and base board which can be easily separated from the vertical stand and stored along the back surface of the vertical stand with the base board constructed to enable quick and easy support from a bank of a body of water, a pier or boat. The vertical stand pivotally supports a tubular fishing rod holder for pivotal movement about an axis transverse of the vertical stand. A plurality of stretch cords, such as "bungee" cords, extend between the rod holder and vertical stand and forms an adjustable power system to enable the present invention to support small rods and reels as well as larger salt water rods and reels. The pivotal fishing rod holding tubular member and the vertical stand include a trigger mechanism holding the fishing rod holder in fishing position and releasing the fishing rod holder to pivot upwardly to an upright position to set the hook. The trigger mechanism includes a trip bar mounted on the fishing rod holder, a trip roller mounted on the fishing rod holder and a holding or locking bar mounted on the vertical stand. The fishing line extending from the reel to the fish hook engages the trip bar at longitudinally spaced points to release the trigger mechanism with adjustment of the fishing line on the trip bar enabling adjustment in the sensitivity of the trigger mechanism to enable use of the device when catching fish of different sizes or with different characteristics of taking bait on the fish hook.

An object of the present invention is to provide a pivotal fishing rod holder with automatic hook setting mechanism adapted for use on a boat, pier or bank of a body of water and constructed of a minimum of moving components and easily manufactured by conventional manufacturing techniques.

Another object of the invention is to provide a fishing rod holder in accordance with the preceding object in which a supporting frame is constructed of a vertical stand and a base board which can be stored in a vertical position on the vertical stand and which includes bottom rubber pads and capable of being anchored to various types of supporting surfaces.

A further object of the invention is to provide a fishing rod holder in accordance with the preceding objects incorporating various safety features including protective side shields to reduce pinch points between the pivotal rod holder and supporting stand and a safety pin inserted below the pivotal rod holder to maintain the rod holder in a fishing position until a trigger mechanism, power system and support structure are properly oriented at which time the safety pin can be removed in order for the hook setting function to be actuated by tension on a fishing line caused by a fish taking the bait on the fish hook.

A still further object of the present invention is to provide a fishing rod holder with automatic hook setting mechanism in which the pivotal fishing rod holder engages a shock absorber at the upper end of the supporting stand to cushion the movement of the pivotal rod holder so that it comes to an easy stop when the fishing rod and fishing rod holder are pivoted rapidly upwardly when setting the hook.

Yet another object of the present invention is to provide a fishing rod holder in accordance with the preceding objects in which the upper end of a supporting stand is provided with a carrying handle to facilitate transport of the device when carrying it to or from a fishing site.

Still another significant object of the invention is to provide a pivotal fishing rod holder is provided with an insert to adapt the rod holder to receive fishing rod handles of different structural characteristics and which will allow the fishing rod handle to be easily inserted, securely retained and easily removed after the hook has been set. The insert is in the form of a tubular cylindrical insert held in place by a resilient band or a precut piece of carpet can be used in the end of the tube for retaining the fishing rod handle in the pivotal rod holder.

These together with other objects and advantages which will become subsequently apparent reside in the details of construction and operation as more fully hereinafter described and claimed, reference being had to the accompanying drawings forming apart hereof, wherein like numerals refer to like parts throughout.

BRIEF DESCRIPTION OF THE DRAWINGS

FIG. 9 is a side elevational view of the holding bar which engages the roller and trip bar.

FIG. 10 is a top plan view of the holding bar.

FIG. 11 is a plan view of the insert tube for the fishing rod holder.

FIG. 12 is a plan view of the insert tube and the associated fishing rod holder.

DESCRIPTION OF THE PREFERRED EMBODIMENTS

Figure 1:
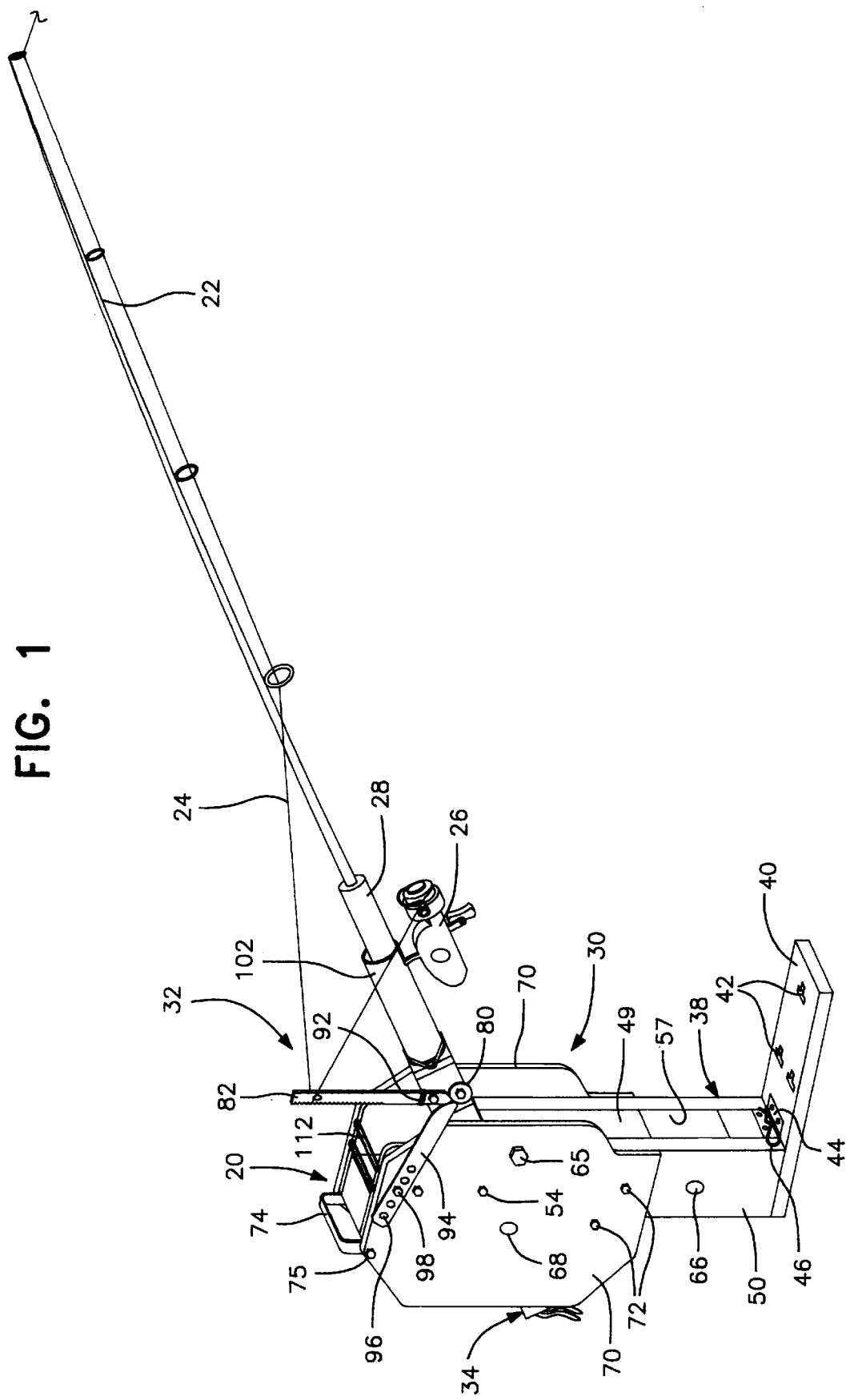
FIG. 1 is a perspective view of the fishing rod holder with automatic hook setter of the present invention.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

The fishing rod holder and automatic hook setting mechanism of the present invention is illustrated in its entirety in FIG. 1 and is generally designated by reference numeral 20. As illustrated, a fishing rod 22 having a fishing line 24 thereon and a spinning reel 26 associated with the handle 28 on the fishing rod 22 is supported by the fishing rod holder and automatic hook setting mechanism 20. However, it is pointed out that fishing rods of various types including different types of reels and different styles of handles may be used. FIG. 1 illustrates the fishing rod 22 oriented in a fishing position in which the fishing rod 22 extends outwardly and upwardly at a desired angle to orient the tip end of the fishing rod and the fishing line extending therefrom in optimum relation to a body of water being fished.

The fishing rod holder and automatic hook setting mechanism of the present invention generally includes a supporting structure 30, a trigger mechanism 32 to retain the fishing rod 22 in fishing position until tension on the fishing line actuates the trigger mechanism and releases the fishing rod 22 in a pivotal fishing rod holder 34 to pivot upwardly to the hook setting position illustrated in FIG. 1 by a power system generally designated by reference numeral 36.

The support structure 30 includes a vertical stand 38 supported by a base board 40 that is removably connected to the lower end of the vertical stand 38 and projects outwardly therefrom in generally underlying relation to the fishing rod 22. The base board 40 includes 4 pads 41 of rubber or similar material on the bottom surface thereof to stabilize the rod holder and hook setter when positioned on various support surfaces. The base board 40 also includes a plurality of T-shaped openings 42 through which tent stakes can be inserted and driven into a bank alongside a body of water being fished to anchor the present invention in place. Two T-shaped openings 42 are positioned adjacent stand 38 to provide additional lateral stability to the stand. The T-shaped openings 42 may also be used to secure the support structure to a pier or boat by using screw treaded fasteners or by any other attaching and detaching means.

Figure 5:
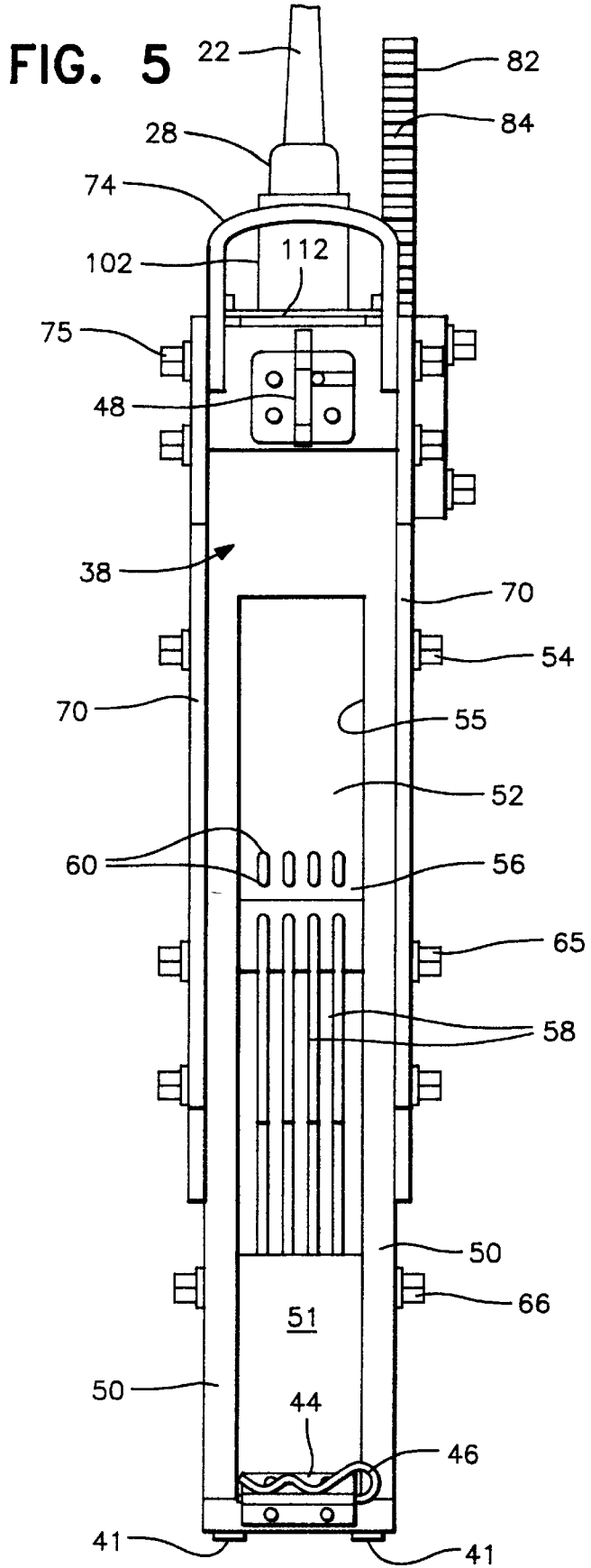
FIG. 5 is a rear view of the fishing rod holder and automatic hook setter of this invention.

At the front juncture between the base board 40 and the vertical stand 38, each component is provided with a hinge component 44 having aligned hinge barrels which receive a spring connector 46 generally in the configuration of a hair pin with one leg of the spring connector extending through the hinge barrels and the other leg of the spring connector frictionally engaging the exterior of the hinge barrels in order to detachably connect the hinge components 44. The juncture between the rearward end of the base board 42 and the rear surface of the vertical stand 38 includes similar detachable hinge components 44 and connector 46 as illustrated in FIG. 5. This structure enables the elongated base board 40 to be separated from the vertical stand 38 and positioned along the rearward surface thereof with the hinge barrel component 44 and connector 46 at the end of the base board being connected to the hinge component 44 at the bottom rear surface of the vertical stand 38. The upper end of the base board 40 is retained in position against the rear of the stand 38 by a slide lock 48 to retain the base board 40 against the rearward surface of the vertical stand 38 to facilitate transport and storage with the base board 40 in a stored, compact position with respect to the vertical stand.

Figure 2:
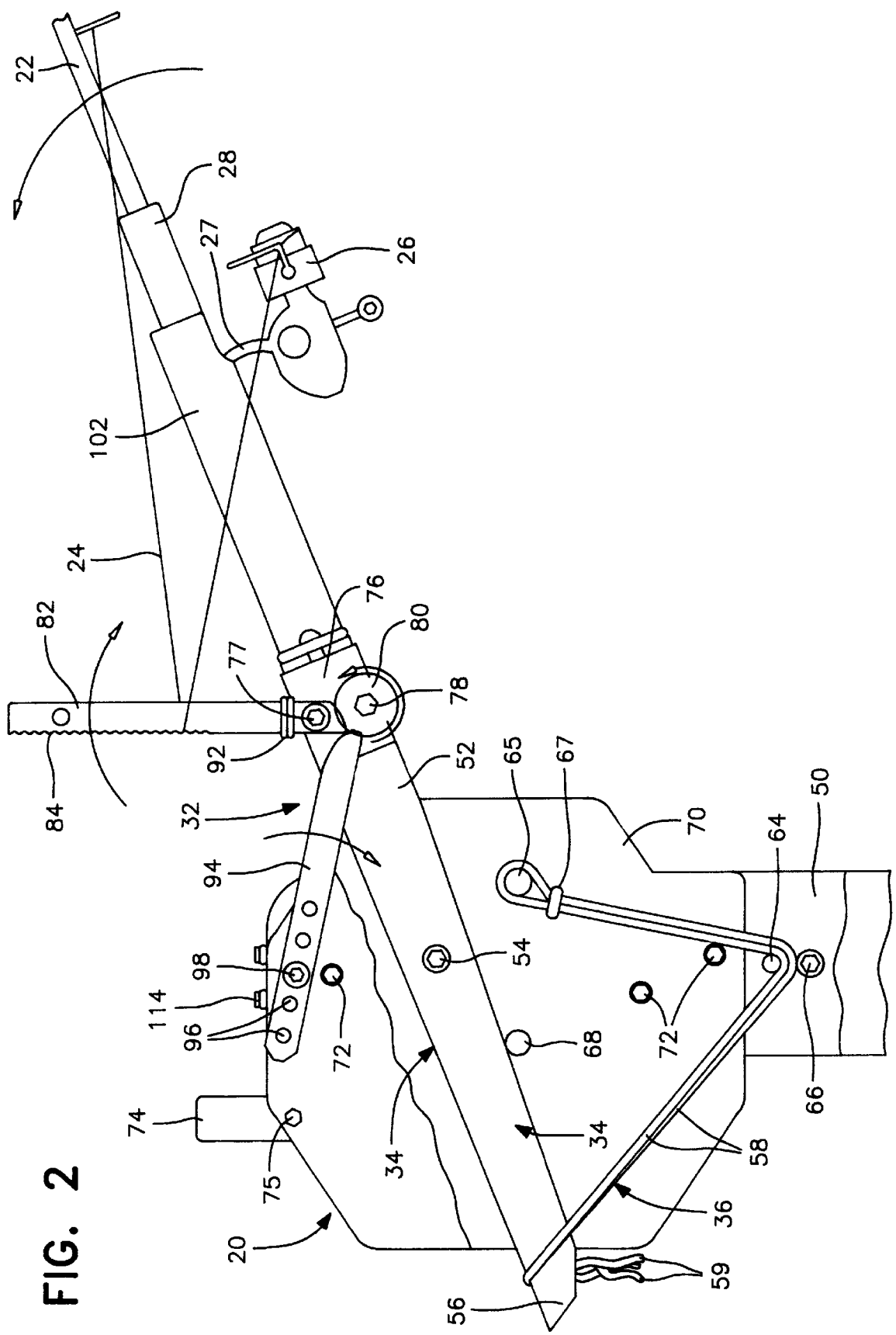
FIG. 2 is a side elevational view, on an enlarged scale, of the fishing rod holder including the components of the trigger mechanism and supporting structure when in a fishing condition.
Figure 4:
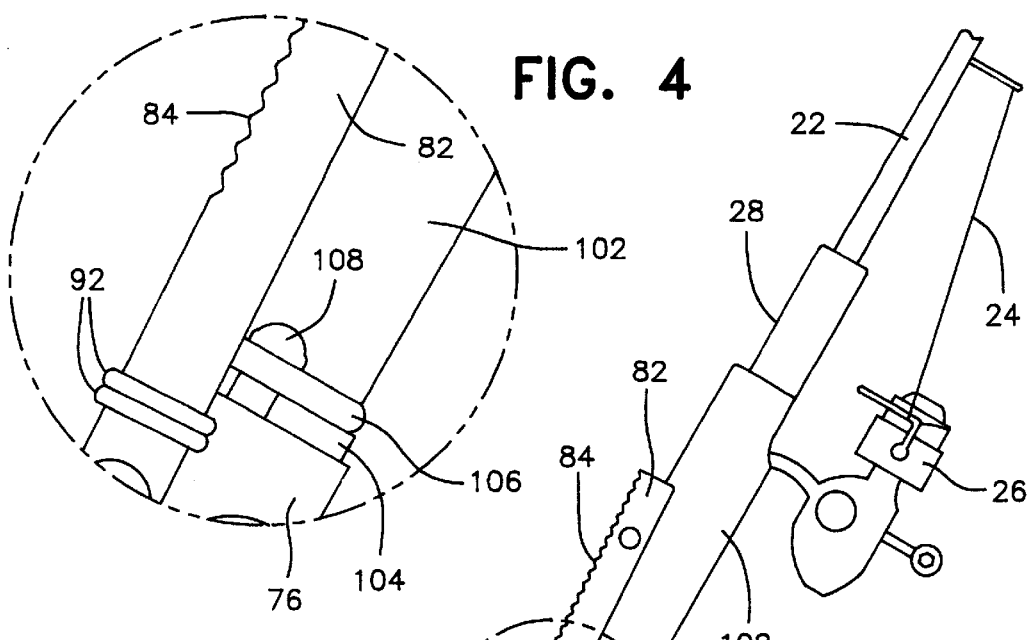
FIG. 4 is a fragmental elevational view of the trip bar and tube insert for the fishing rod holder.

The vertical stand 38 includes a front member 49, a rear member 51 and side members 50 which receive the pivotal fishing rod holder 34 therebetween. The fishing rod holder 34 includes a square tube 52 supported between the side members 50 by a pivot pin or bolt 54 with the rearward end of the square tube 52, designated by reference numeral 56 projecting rearwardly from an opening 55 in the rear member 51 of the vertical stand and the forward end of the tube 52 extends forwardly from the vertical stand as illustrated in FIG. 2. The front member 49 of the stand 38 also includes an open area 57 to provide access to the space between the side members 50.

The power system 36 for biasing the pivotal fishing rod holding tube 52 to a hook setting position is two looped resilient cords 58 each having two ends 59 which extend through spaced apertures 60 in a top wall 62 of the tubs 52 with the free ends 59 thereof dangling downwardly therefrom as illustrated in FIG. 2. The resilient cords are preferably bungee cords with free terminal ends 59 extending through the apertures 60. The resilient cords 58 extend inwardly and downwardly from the tube 52 and under and around a plurality of pulleys 64 mounted on a shaft or bolt 66 extending through the stand 38 below side plates 70 and then upwardly and over a transverse bolt 65 oriented forwardly and slightly below pivot bolt 54. The cords 58 are doubled or looped over the bolt 65 and an O-ring 67 encircles each cord 58 just below bolt 65 to retain the cords in position on the bolt 65. Also, the open area 57 provides access to the pulleys 64 and the cords 58. This provides elongated resilient cords to provide the desired force to pull the rearward end of the tube 52 downwardly. Any number of resilient cords may be used and their effective length can be lengthened or shortened by threading the cords through the spaced apertures 60 by grasping the terminal loose ends 59 of the cords 58 and stretching and pulling them through the apertures 60.

When setting up the fishing rod holder and automatic hook setting mechanism of the present invention and setting the trigger mechanism 32, a safety bolt 68 is inserted through the vertical stand 38 below the tube 52 and between the pivot bolt 54 and the rearward end 56 of the tube 52 thus maintaining the fishing rod holding tube 52 in the position illustrated in FIGS. 1 and 2 with the resilient cords 58 stretched and tensioned. This enables the trigger mechanism 32 to be oriented in a set position without any danger of the fishing rod holder 34 pivoting from a fishing position to a hook setting position which could result in injury. As an additional safety function, the upper end of the vertical stand 38 is provided with a pair of enlarged side plates 70 which enclose and protect the resilient cords and eliminate sharp angled pinch points between the fishing rod holding tube 52 and the vertical stand 38. The side plates 70 may be secured in place by removable through bolts 72 and a stationary U-shaped handle 74 is attached between the upper edges of the side plates 70 by fasteners 75. The handle 74 enables the device to be easily carried to or from a fishing site.

Figure 7:
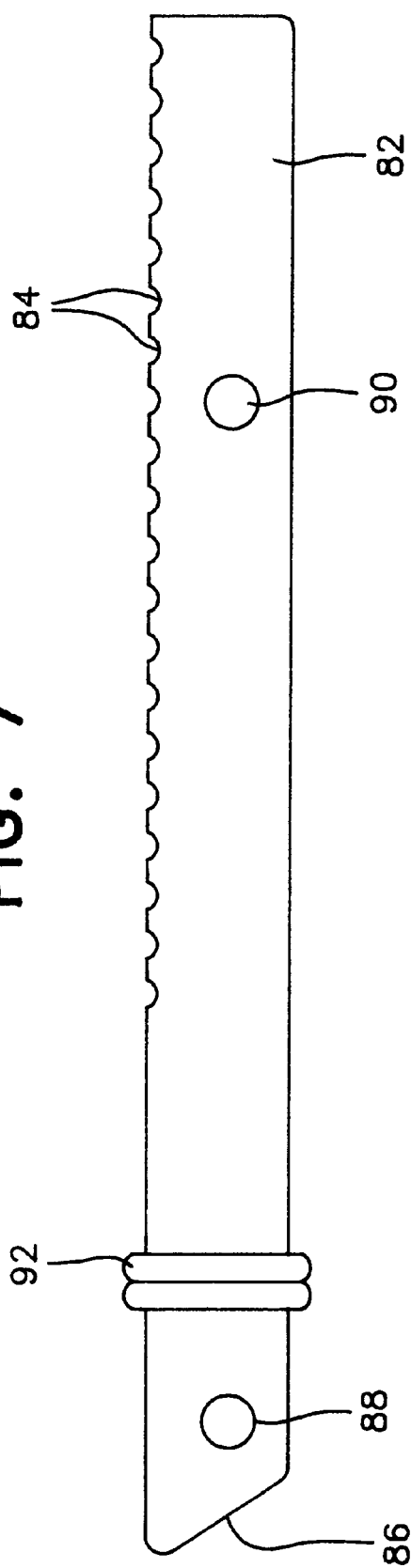
FIG. 7 is a side elevational view of the trip bar.
Figure 8:
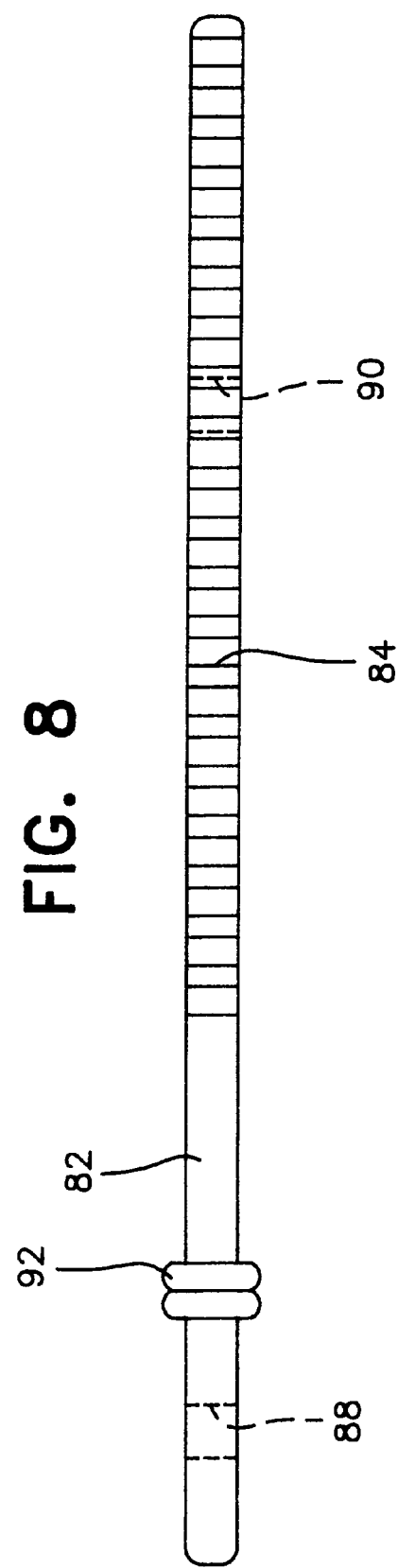
FIG. 8 is a top plan view of the trip bar.

The pivotal tube 52 is provided at its forward end with a block 76 having fasteners 77 and 78 extending therefrom which forms part of the trigger mechanism. A trip roller 80 is rotatably mounted on one of the fasteners 78 and a trip bar 82 is pivotally mounted on the other fastener 77 so that the roller so can rotate as illustrated by the arrow in FIG. 2 and the trip bar 82 can pivot as indicated by the curved arrow in FIG. 2. As illustrated in FIGS. 7 and 8, the trip bar 82 is of rigid rectangular cross-sectional configuration and includes a plurality of spaced notches or teeth 84 on a rearward edge thereof. The teeth or notches 84 are engaged by the fish line 24 with the adjustment of the fish line 24 longitudinally of the trip bar 82 varying the sensitivity of the trigger mechanism 32 by increasing the lever arm from the supporting pivot fastener 77 for the trip bar 82 to the point of application of force from the fishing line 24 to the trip bar 82. This enables a smaller fish or a larger fish to actuate the trigger mechanism by varying the position of the fishing line 24 longitudinally along the length of the trip bar 82. The specific structure of the trip bar 82 is illustrated in FIGS. 7 and 8 with a lower end of the trigger bar 82 being beveled at 86 and provided with a mounting hole 88 positioned on the support fastener 77. An aperture 90 is provided adjacent the upper end of the trip bar to enable it to be supported in a stored position when it has been detached from the block 76. The block 76 includes openings 79 to provide access to fasteners 77 and 78 by a hand tool such as a screwdriver. Also, a pair of resilient O-rings 92 are provided on the trip bar 82 which will frictionally engage the block 76 and hold the trip bar 82 in a forward position when the trip bar releases the trigger mechanism and the resilient cords pivot the tube 52 upwardly to prevent the trip bar 82 from freely pivoting rearwardly toward the tube 52 when the tube 52 comes to an abrupt halt after moving to the hook setting position as illustrated in FIG. 3.

The trigger mechanism also includes a holding bar 94 having a plurality of longitudinally spaced apertures 96 therein for receiving a pivot bolt 98 to support the holding bar pivotally from a side plate 70 and to select a pivot point for the holding bar and adjustment of the angle of the tube 52 and trip bar 82. The forwardly projecting end of the holding bar 94 is tapered and rounded at 100 for engaging the rearward corner of the inclined beveled end 86 of the trip bar 82 as illustrated in FIGS. 8 and 9 when the trigger mechanism 32 is set. The rounded tip end 100 of the holding bar 94 includes a shoulder 99 on which the corner of trip bar 82 is positioned when set. The projection which forms shoulder 99 includes a shallow concave indentation 101 which engages the periphery of the roller 80 just below the corner of trip bar 82. When the trip bar 82 is pulled forwardly at its upper end by the fish line 24, the corner of trip bar 82 moves along rounded end 100 of holding bar 94 thereby camming the forward end of the holding bar 94 downwardly and slightly pivoting tube 52 if necessary so that the holding bar is released from the roller 80 and swings downwardly as indicated by the curved arrow in FIG. 2 about pivot pin or bolt 98. This releases the fishing rod tube 52 which is pivoted rapidly about pivot bolt 54 to move the fishing rod 22 upwardly to set the fish hook. Also, the trip bar 82 swings forwardly and the O-rings 92 engage the block 76 to hold the trip bar 82 in accessible position for resetting the trigger mechanism to its fishing position as illustrated in FIGS. 1 and 2. As illustrated, five holes 98 are provided to provide five angle settings for the tilt tube 52.

The tube 52 receives an insert tube 102 which telescopes into the end of the tube 52 and includes a central flange 104 which buts against the end of the tube 52 as illustrated in FIGS. 11 and 12. A rubber O-ring 106 is positioned on insert tube 102 immediately forward of the flange 104 and is laterally stretched and anchored to the block 76 by a fastener 108 as illustrated in FIG. 12. The insert tube 102 is provided with a notch 110 which enables movement of the reel mounting shank 27 inwardly of the outer end of the insert tube 102. The O-ring 106 retains the insert tube 102 in place in the tube 52 and permits the tube 102 to rotate as indicated by arrow 103 to permit the stem of a top mounted reel on a fishing rod to be received in notch 110. This enables the fishing rod holding tube 52 to effectively support various types of fishing rods having various handle characteristics, Rather than a insert tube 102, a preformed carpet or other fabric insert or rubber insert may be utilized in tube 52 to facilitate reception of various fishing rod handles.

Figure 3:
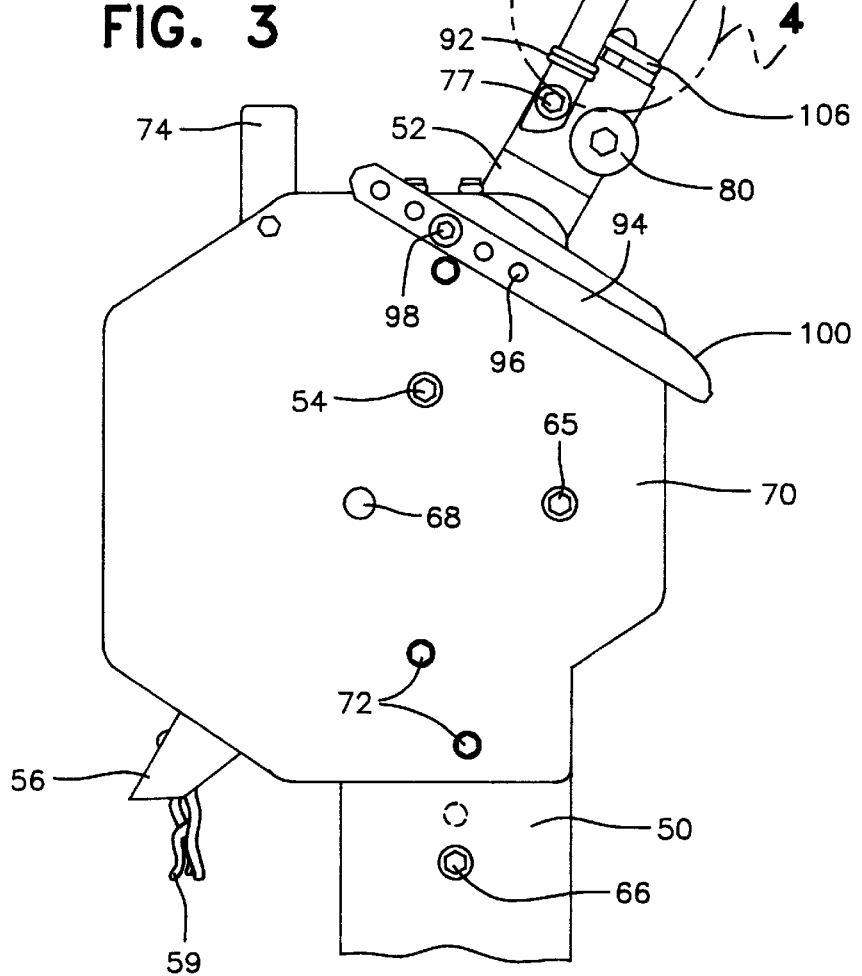
FIG. 3 is a side elevational view similar to FIG. 2 but illustrating the components in a hook setting position.
Figure 6:
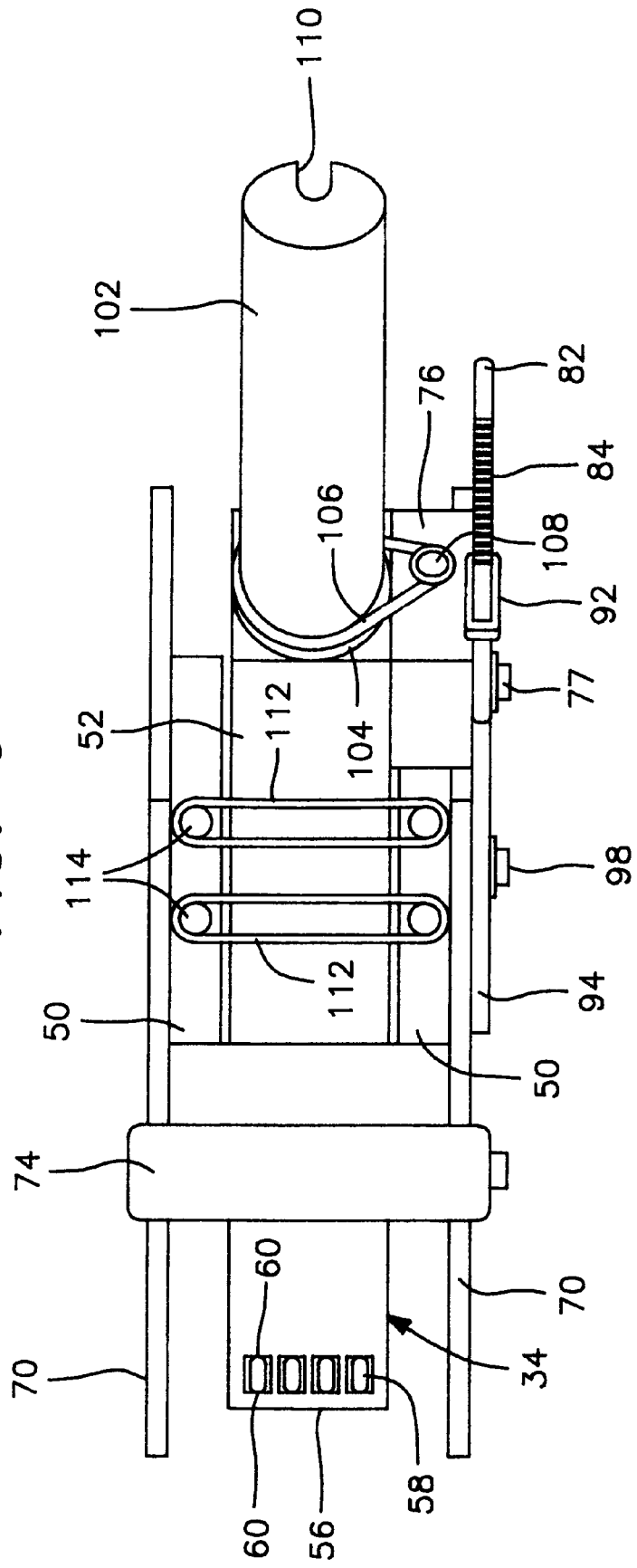
FIG. 6 is a top plan view of the structure illustrated in FIG. 2 with the fishing rod removed illustrating the resilient band which holds the tube insert in the fishing rod holder and the shock absorber structure for the fishing rod holder.

FIGS. 5 and 6 illustrate a pair of shock absorbing O-rings 112 connecting the upper ends of the side members 50 forming the vertical stand 38 and positioned in the path of movement of the forward end portion of the fishing rod holder 34 to cushion and absorb the shock of the rapid pivotal movement of the forward end of the tube 52 as it is pivoted from the fishing position of FIG. 2 to the hook setting position of FIG. 3. The rubber O-ring members which are stretched into an oval configuration are attached to the upper ends of the side members 50 by headed fasteners 114. The shock absorbing members 112 may include a forward shock absorber that is not as strong or sturdy as the rearward shock absorber thereby providing a progressive cushioning effect on upward swinging movement of the fishing rod holder 34.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fishing rod holder and automatic hook setting mechanism comprising a supporting stand adapted to be mounted on a pier, boat or bank of a body of water being fished, an elongate fishing rod holder having one end extending toward a body of water being fished and an opposite end extending beyond the supporting stand in remote relation to the body of water being fished, a pivot member pivotally supporting said fishing rod holder from said stand, said one end of said fishing rod holder supporting a fishing rod handle with the fishing rod extending toward the body of water being fished, a resilient device interconnecting the stand and said opposite end of said fishing rod holder to bias said holder about said pivot member to move said one end of said holder arcuately upwardly from a fishing position to a hook setting position, and a trigger mechanism associated with said stand and said one end of the holder and a fishing line on the fishing rod to retain the holder and fishing rod in a fishing position until tension is exerted on the fishing line by a fish taking the bait from a fish hook on the fishing line and releasing the trigger mechanism to enable the holder and fishing rod supported thereon to move rapidly to an upward position to move the fishing rod in a vertical arc about the pivot member to set the hook in the fish being caught, said trigger mechanism including a trip bar pivotally mounted on said one end of said holder and extending upwardly therefrom, said trip bar including a plurality of longitudinally spaced attachment points thereon receiving the fishing line at points longitudinally spaced from the pivotal connection between the trip bar and said one end of said holder to vary the force necessary to pivot the trip bar, said trigger mechanism including a roller journaled on said one end of said holder in alignment with a lower end of said trip bar, said trigger mechanism also including a holding bar pivotally mounted on said stand and including a forward end engaged with a lower end of said trip bar and said roller to retain the trip bar in an upright position, forward movement of an upper end of said trip bar causing downward movement of the forward end of said holding bar along the roller to release the holding bar thereby releasing said one end of said holder to enable the holder and rod to be moved rapidly upwardly to a hook setting position.

2. The fishing rod holder as defined in claim 1, wherein said stand includes a resilient shock absorbers overlying the holder and engaging said holder when moving from a fishing position to a hook setting position to stop and cushion the stopping movement of the holder.

3. The fishing rod holder as defined in claim 1, wherein said resilient device connected to the opposite end of said holder being a plurality of adjustable resilient cords in order to vary the resilient force exerted on the holder to pivot it about said pivot member.

4. The fishing rod holder as defined in claim 1, wherein said stand includes a base and a vertical stand having spaced side pieces receiving a central portion of said holder therebetween whereby said one end and opposite end of said holder pivot in a vertical plane about an axis defined by said pivot member.

5. The fishing rod holder as defined in claim 4, wherein said holder is tubular and includes an insert in said one end thereof, said insert adapted to receive a handle of a fishing rod to support the fishing rod while in a fishing position and when moved arcuately upwardly toward a vertical position to a hook setting position with the fishing rod being easily removed from and inserted into the insert to enable the fish caught to be reeled in, removed and the fishing rod handle reinserted into said tube insert.

6. The fishing rod holder as defined in claim 4, wherein said spaced side pieces extend above said pivot member and a pair of resilient shock absorbing members extending between upper ends of said side pieces in the path of movement of the fishing rod holder to cushion movement of said holder when moving from a fishing position to a hook setting position.

7. The fishing rod holder as defined in claim 4, wherein said spaced side pieces extend above said pivot member and a handle connected to and extending between upper ends of said side pieces to enable the fishing rod holder to be carried to and from a fishing site.

8. The fishing rod holder as defined in claim 4, wherein said base includes an elongate board connected to lower ends of said spaced side pieces and extending forwardly therefrom in generally underlying relation to a forward end of a fishing rod holder.

9. The fishing rod holder as defined in claim 8, wherein said side pieces and elongate board are interconnected by removable pins to enable separation of the elongate board from the side pieces for storing the elongate board vertically alongside said side pieces.

10. The fishing rod holder as defined in claim 3, wherein said opposite end of said holder includes a plurality of pairs of spaced openings, the openings in each pair being closely spaced, a terminal end of a resilient cord being threaded through a pair of said openings and being adjustable therethrough to vary the resilient force exerted on the holder by said cords.

11. The fishing rod holder as defined in claim 10, wherein said resilient cords have central portions passing under a transverse member below said pivot member and below the points of connection of the cords with the stand and said opposite end of said holder to provide multiple lengths of resilient cords to bias said holder toward hook setting position.

12. The fishing rod holder as defined in claim 1, wherein said trip bar includes a resilient ring frictionally engaging a forward portion of said holder to prevent face pivoting movement of the trip bar when the holder moves rapidly toward hook setting position.

13. The fishing rod holder as defined in claim 5, wherein said insert is tubular and provided with a notch in a forward end thereof to receive a reel mounting shank therein, said tubular insert being rotatable to receive reel mounting shanks in different angular relations about a longitudinal axis of a fishing rod supported in the insert and a resilient member engaged with said insert to retain the insert in adjusted position.

14. The fishing rod holder and hook setter as defined in claim 6, wherein said holding member includes an insert adapted to receive a fishing rod handle, said inset being tubular with a notch in an end thereof projecting beyond said holding member to receive a mounting shank of a fishing reel to position the fishing reel in relation to said holding member.

15. A fishing rod holder and hook setter comprising a support having an upwardly extending support member, an elongate fishing rod holding member supported at an upper end portion of said support member for arcuate pivotal movement about a generally horizontal axis oriented between ends of said holding member, said holding member supporting a fishing rod projecting from an end portion of said holding member and extending into fishing position above a body of water being fished, a resilient power system connected between said support member and holding member to bias said holding member toward a generally upwardly extending hook setting position and a releasable structure interconnecting said holding member and support member to retain said holding member and fishing rod in fishing position and releasing said holding member in response to predetermined tension exerted on a fishing line to enable said resilient power system to move said holding member and fishing rod to pivot to a hook setting position, said releasable structure including a trip bar pivotally mounted on said holding member and extending upwardly therefrom, a fishing line on the fishing rod engaged with said trip bar, a holding bar pivotally mounted on said support member and including a swingable end engaged with a lower end of said trip bar to prevent pivotal movement of said holding bar, said fishing line pivoting said trip bar to release the holding member when a fish strikes bait on the fishing line, a trip roller journalled on said holding member and in alignment with and engaged with the lower end of the trip bar and the swingable end of the holding bar, rearward movement of the lower end of said trip bar caused by forces exerted on an upper end of the trip bar by the fishing line disengaging the holding bar from the roller by pivoting a forward end of the trip bar downwardly and releasing the lower end of the trip bar from the holding bar to enable the resilient power system to pivot said holding member to fish hook setting position.

16. The fishing rod holder and hook setter as defined in claim 15, wherein said holding member includes a tubular member open at one end to telescopically receive a fishing rod handle, said resilient power system including a plurality of resilient cords, each cord extending through a pair of spaced apertures in said support member to enable adjustment of the tension on the cords to vary the force biasing said tubular member toward hook setting position.

17. The fishing rod holder and hook setter as defined in claim 16, wherein said support member includes a resilient shock absorber to cushion movement of the holding member toward hook setting position.

* * * * *